(12) United States Patent
Dittmer

(10) Patent No.: US 7,175,152 B2
(45) Date of Patent: Feb. 13, 2007

(54) DISPLAY MOUNTING DEVICE

(75) Inventor: Jay Dittmer, Prior Lake, MN (US)

(73) Assignee: CSAV, Inc., Wellesley, MA (US)

( * ) Notice: Subject to any disclaimer, the term of this patent is extended or adjusted under 35 U.S.C. 154(b) by 28 days.

(21) Appl. No.: 10/889,464

(22) Filed: Jul. 12, 2004

(65) Prior Publication Data

US 2005/0127260 A1 Jun. 16, 2005

Related U.S. Application Data

(60) Provisional application No. 60/486,503, filed on Jul. 11, 2003.

(51) Int. Cl.
*A47K 1/00* (2006.01)

(52) U.S. Cl. .................... 248/917; 361/681; 292/113; 248/221.11; 248/222.13; 248/222.51; 248/225.21

(58) Field of Classification Search ........... 248/221.11, 248/222.13, 222.51, 225.21, 917; 361/681; 403/321, 322.4; 439/57; 292/95, 109, 113, 292/100, 106, 108, 137, 176, DIG. 11, 53
See application file for complete search history.

(56) References Cited

U.S. PATENT DOCUMENTS

| | | | | |
|---|---|---|---|---|
| 863,645 A | * | 8/1907 | Reily | 292/281 |
| 1,916,816 A | * | 7/1933 | Sprake | 292/198 |
| 3,000,658 A | * | 9/1961 | Sprouse | 403/321 |
| 3,488,622 A | * | 1/1970 | Gley | 439/157 |
| 4,290,633 A | * | 9/1981 | Sullivan | 292/114 |
| 4,627,210 A | | 12/1986 | Beaulieu | |
| 4,658,560 A | | 4/1987 | Beaulieu | |
| 5,995,179 A | * | 11/1999 | Tamura et al. | 349/58 |
| 6,042,068 A | * | 3/2000 | Tcherny | 248/221.11 |
| 6,250,039 B1 | | 6/2001 | Karten et al. | |
| 6,400,560 B1 | | 6/2002 | Chian | |
| 6,402,109 B1 | | 6/2002 | Dittmer | |
| 6,480,243 B2 | | 11/2002 | Yamamoto | |
| 6,560,094 B2 | * | 5/2003 | Schmidt | 361/681 |
| 6,561,600 B1 | | 5/2003 | Seeley et al. | |
| 6,591,571 B2 | | 7/2003 | Fritsche et al. | |
| 6,695,270 B1 | | 2/2004 | Smed | |
| 6,758,454 B2 | * | 7/2004 | Smed | 248/314 |
| 6,935,883 B2 | * | 8/2005 | Oddsen, Jr. | 439/374 |
| 2003/0141425 A1 | * | 7/2003 | Obdeijn | 248/317 |
| 2004/0232298 A1 | * | 11/2004 | Bremmon et al. | 248/281.11 |

OTHER PUBLICATIONS

Chief Manufacturing, Q-Latch™ Mounting System, Brochure, 2002, pp. 4.

* cited by examiner

*Primary Examiner*—Anita King
*Assistant Examiner*—Michael McDuffie
(74) *Attorney, Agent, or Firm*—Patterson, Thuente, Skaar & Christensen, P.A.

(57) ABSTRACT

A flat panel display mounting apparatus that enables quick and easy mounting and dismounting of the flat panel display. The system includes a first bracket having a periphery defining a plurality of spaced apart notches and a second bracket selectively removably receivable on the first bracket that includes a plurality of fastening buttons, each fastening button defining a slot. The fastening buttons are spaced apart and positioned correspondingly with the notches of the first bracket so that the slot of each fastening button receives the periphery of the first bracket at a separate one of the notches when the second bracket is received on the first bracket.

30 Claims, 12 Drawing Sheets

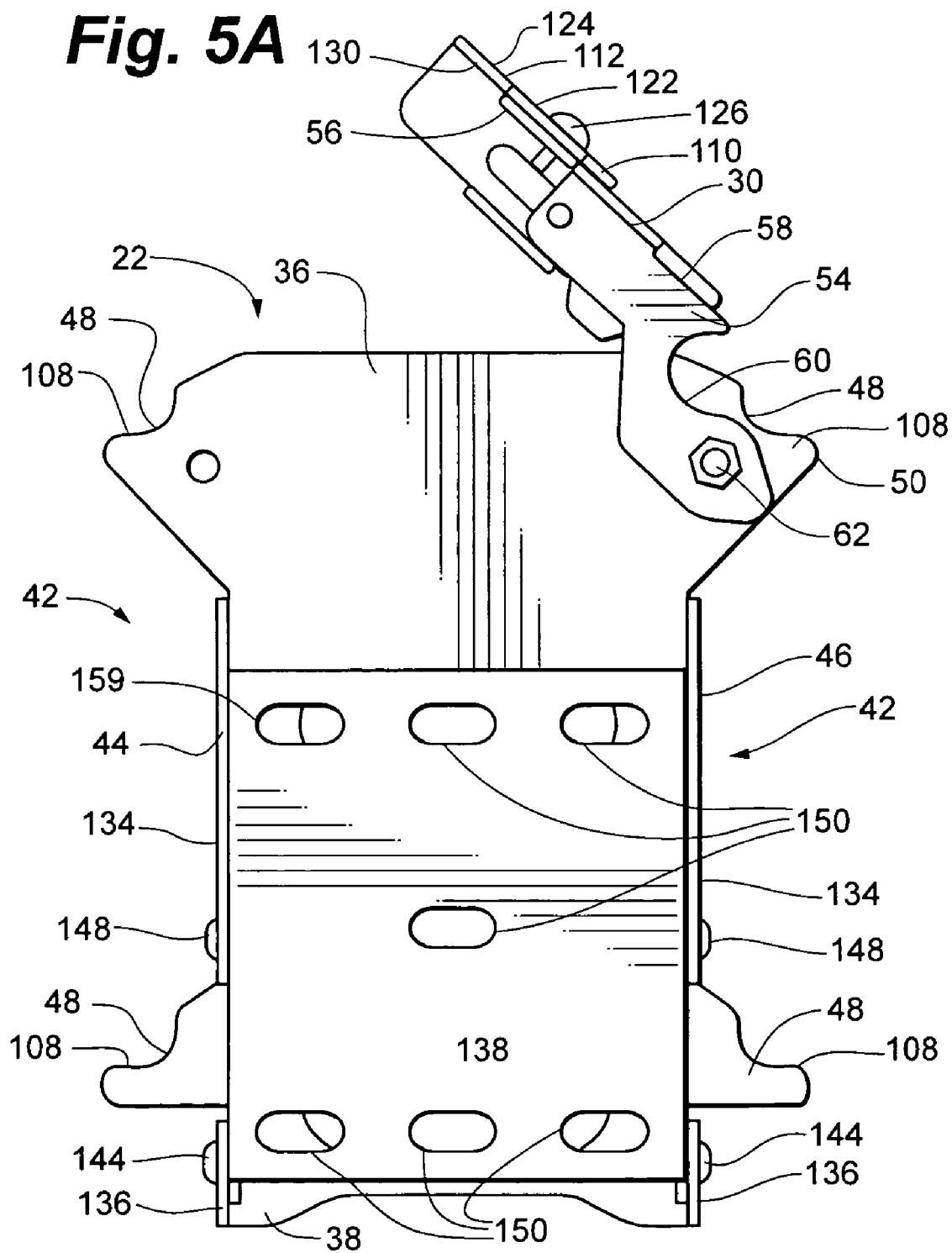

DISPLAY MOUNTING DEVICE

RELATED APPLICATIONS

This application claims the benefit of U.S. Provisional Patent Application Ser. No. 60/486,503, filed Jul. 11, 2003, entitled "DISPLAY MOUNTING DEVICE", and hereby fully incorporated herein by reference.

FIELD OF THE INVENTION

The invention relates generally to video display-mounting devices. More particularly, the present invention relates to mounts for flat panel displays.

BACKGROUND OF THE INVENTION

Flat panel electronic displays, such as LCD and plasma monitors, are now widely used in commercial settings to display information due to their higher resolution and compact size relative to conventional CRT displays. In commercial locations where large numbers of people may need to view the display and where space may be at a premium, it is generally desirable to mount the display overhead. Accordingly, devices of many different configurations exist for mounting a flat panel electronic display to a fixed structure, such as a wall, ceiling, column, beam or the like.

In public facilities, such as conference and conventions centers, where many displays may be in use simultaneously for different purposes, it is often desirable to move displays around in order to accommodate temporary needs. Prior art mounting devices, however, have not been entirely suitable for such applications requiring frequent moving of the display. For example, many prior art devices consist of brackets and arms that are rigidly fastened to the display with threaded fasteners. While such devices offer the desirable quality of rigid support for the display, removal of the threaded fasteners to move the display is tedious, time consuming and sometimes awkward due to the need to support the display as the fasteners are removed.

Other prior art mounting devices have included detachable portions for mounting and dismounting the display. In one such prior art device depicted in FIG. 1, the mount 14 includes two portions, a plate 16 attached to the fixed structure and a plurality of fastening buttons 17 attached to the flat panel display 18. The plate has "keyhole" slots 19 corresponding to the fastening buttons 17. The fastening buttons 17 are inserted through the larger end of the keyhole slot 19 and slid downwardly into the narrower end to secure the flat panel display to the fixed structure. While this type of mount offers improved ease of mounting and dismounting over devices using only threaded fasteners, it requires that the fastening button be inserted into a relatively small aperture. This may be a difficult task for an individual where the display is heavy, bulky, or is being handled overhead from a ladder or manlift. Further, when the display is lifted upward during dismounting, the fastening button may snag on the top or sides of the keyhole slot, inhibiting removal of the display.

Safety is another important concern for display mounting devices used in public settings. Particularly in recent years, as buildings themselves have been designed to better withstand seismic events, a need has been recognized for equipment and fixtures in buildings to remain securely fastened and intact during such occurrences in order to avoid injury to building occupants. In response, standards for overhead display mounting performance have been developed, such as the GR-63 CORE standard. Protection of fragile and expensive displays from impact damage is a related secondary concern.

Moreover, flat panel displays remain relatively expensive devices. As such, particularly where they are accessible to large numbers of people, security against theft of the display is needed.

What is still needed in the industry is a mounting apparatus for a flat panel display that enables quick and easy movement of the display device between mounting locations, while also providing seismic and impact resistant rigid mounting of the display and theft deterrence.

SUMMARY OF THE INVENTION

The mounting apparatus of the present invention substantially meets the aforementioned needs of the industry. The present invention includes a flat panel display mounting apparatus that enables quick and easy mounting and dismounting of the flat panel display. As a result, the flat panel display is readily repositionable to alternative locations. The mounting apparatus of the present invention is self aligning and easily engaged, locked, and disengaged. Further, the mounting apparatus of the present invention provides firm structural mounting of the display to reduce the risk of injury to persons and damage to the display during seismic events, severe weather, or other such occurrences. Further, the invention may include a securing and locking mechanism to reduce the likelihood of theft of the flat panel display.

Accordingly, an embodiment of the invention may include a mounting system for detachably coupling a pair of bodies including a flat panel display device and a fixed structure, wherein a first bracket having a periphery defining a plurality of spaced apart notches is adapted to be operably coupled to one of the bodies, and a second bracket is selectively removably receivable on the first bracket and is adapted to be operably coupled to the other body. The second bracket includes a plurality of fastening buttons, each fastening button has a base portion, a head portion, and a throat portion therebetween defining a slot, the fastening buttons spaced apart and positioned correspondingly with the notches of the first bracket so that the slot of each fastening button receives the periphery of the first bracket at a separate one of the notches when the second bracket is received on the first bracket. Further, the system may include operable means for selectively retaining the second bracket in engagement with the first bracket, such as a latch arm. The latch arm may be pivotable and may include means, such as a longitudinal slide, for locking the latch arm in a latched position.

The fastening buttons may be arranged on the second bracket in a symmetrical, regularly spaced pattern to enable mounting of the display in landscape or portrait orientations or may be non-symmetrically positions. Further, the fastening buttons may be arranged in a symmetrical polygonal or circular pattern to enable the display to be mounted in any of a variety of positions.

The second bracket may be a display interface bracket that is attached to the flat panel display or may be a portion of the display. If configured as a separate component, a plurality of apertures may be provided in the bracket corresponding to fastener receiving locations on the flat panel display to enable the bracket to be attached with fasteners. These apertures may be positioned accordingly to industry standard locations such as VESA standards.

The brackets and latch arm of the device of the present invention may be made from substantial material such as 13 gauge steel, and the fastening buttons made of similarly substantial material so that the device passes seismic testing such as GR-63 CORE. As a result, the display is suitable for use in seismic Zone 4 areas.

BRIEF DESCRIPTION OF THE DRAWINGS

FIG. 5A is a front elevation view of the mount bracket of the embodiment of FIG. 2A;

DETAILED DESCRIPTION OF THE PREFERRED EMBODIMENT

The present invention relates to a mounting system for attaching an electronic display to a fixed structure, and particularly a system adapted for and/or intended to be used with a flat panel electronic display. A flat panel display includes a plasma display, a liquid crystal display, or any present or future kind of display that is similarly relatively flat or having a relatively minimal depth dimension. A fixed structure includes any portion of a building, such as a wall, ceiling, beam, or column, or other similar permanent or temporary structure, portable support structures such as trade show booths, and any other object or structure, such as a pole, to which a display device may be attached.

Figure 1:
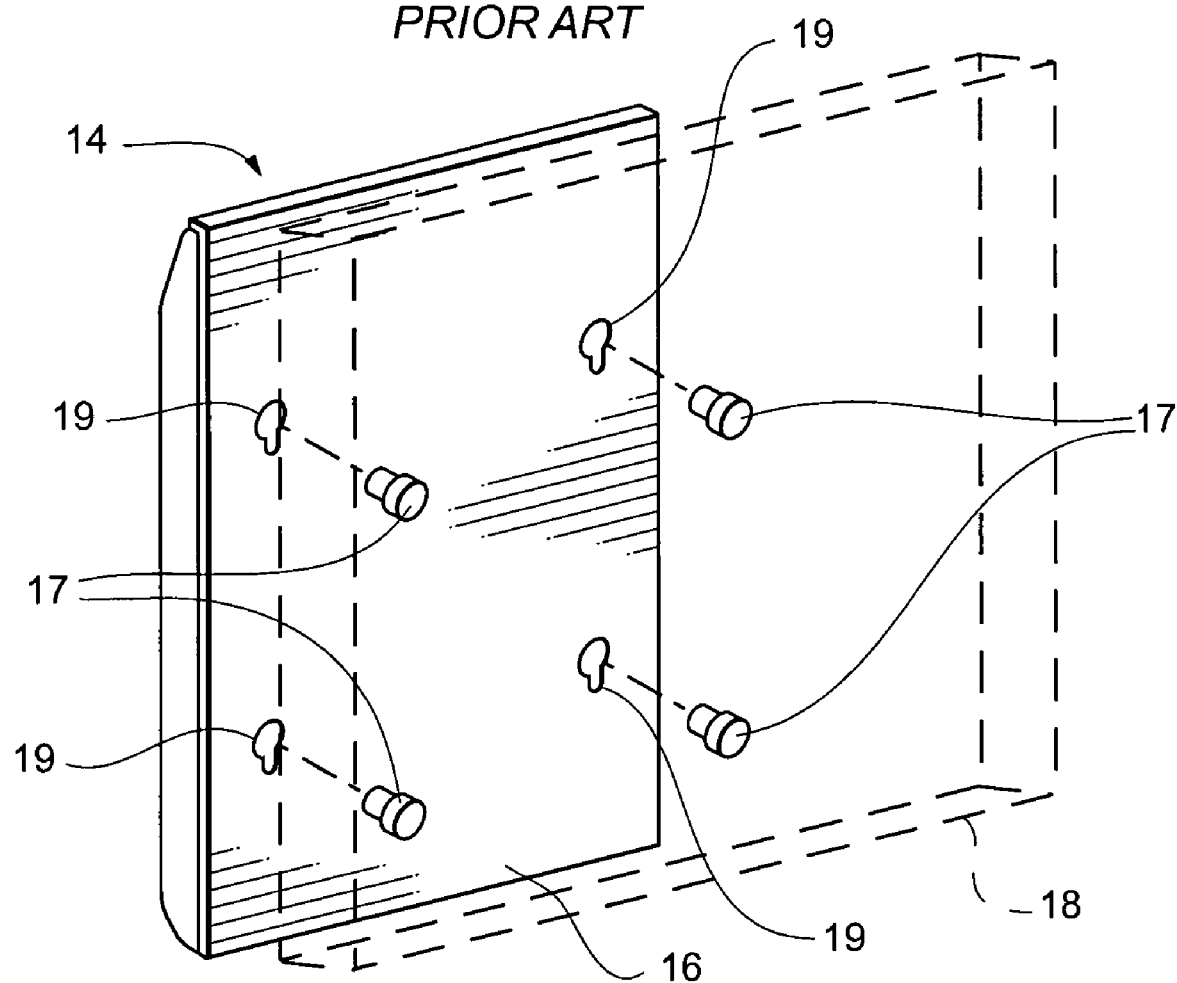
FIG. 1 is a perspective view of a prior art flat panel display mounting device with a flat panel display depicted in broken lines.
Figure 2:
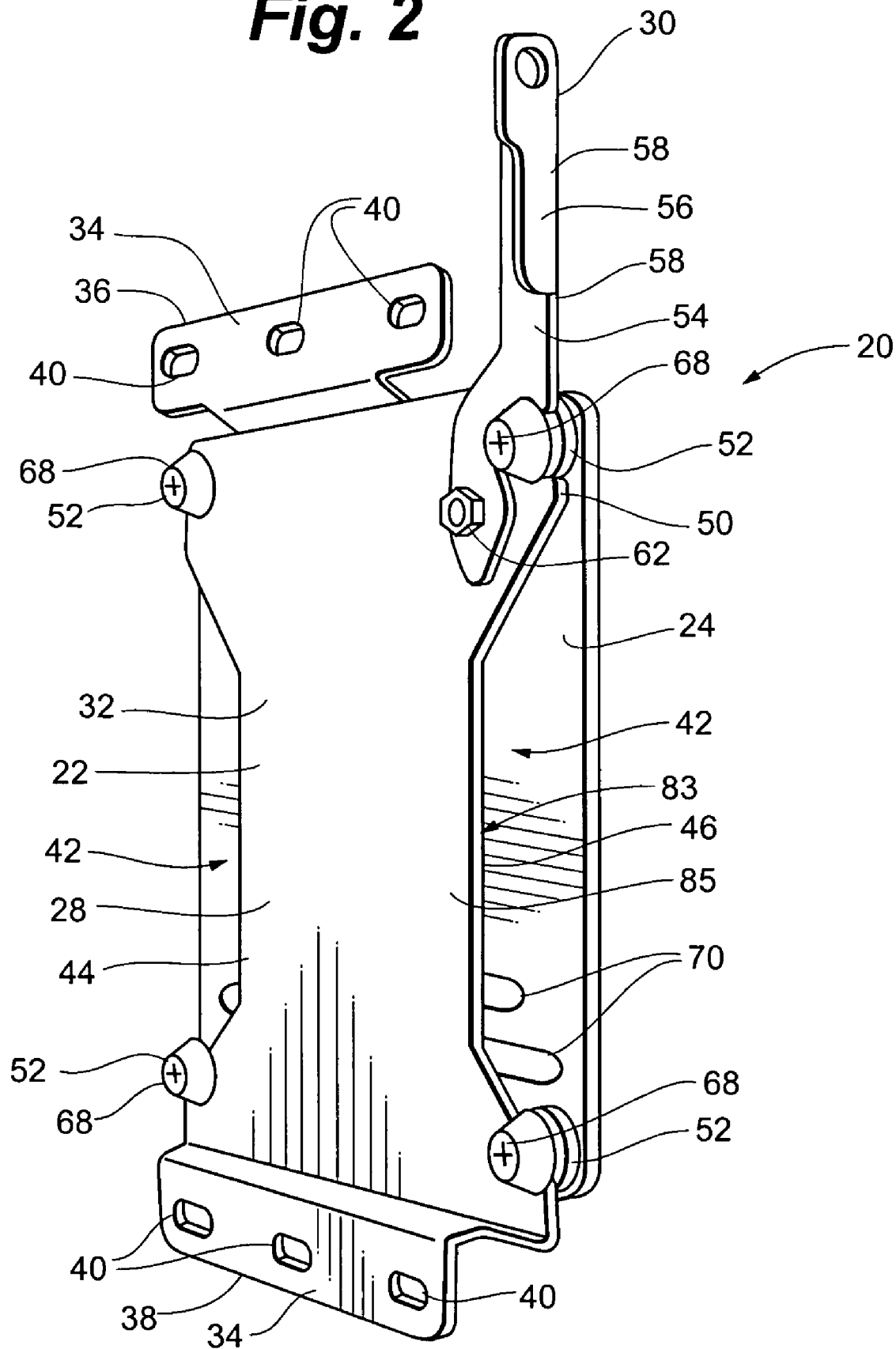
FIG. 2 is a perspective view of an embodiment of a flat panel display mounting system according to the present invention.
Figure 10:
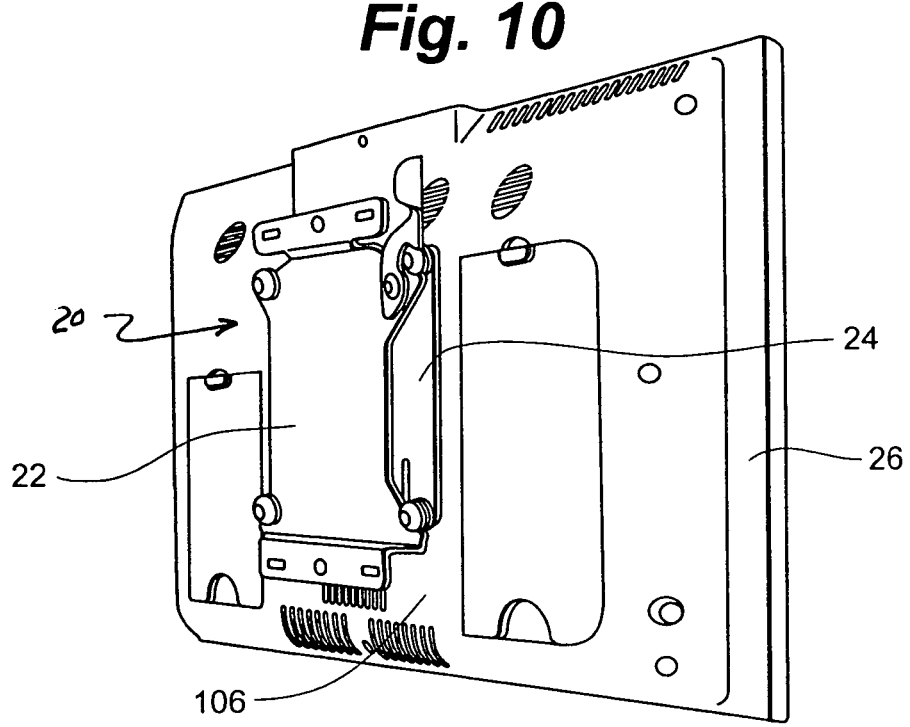
FIG. 10 is a rear perspective view of a flat panel display device with the mount of FIG. 2 attached thereto.

A first embodiment of a flat panel display mounting device 20 is depicted in FIGS. 2 and 10. Mounting device 20 generally includes mount bracket 22 and device interface bracket 24. According to the invention, a flat panel display device 26 may be fastened to device interface bracket 24, while mount bracket 22 is fastened to a fixed structure (not depicted) such as the wall of a building.

Figure 5:
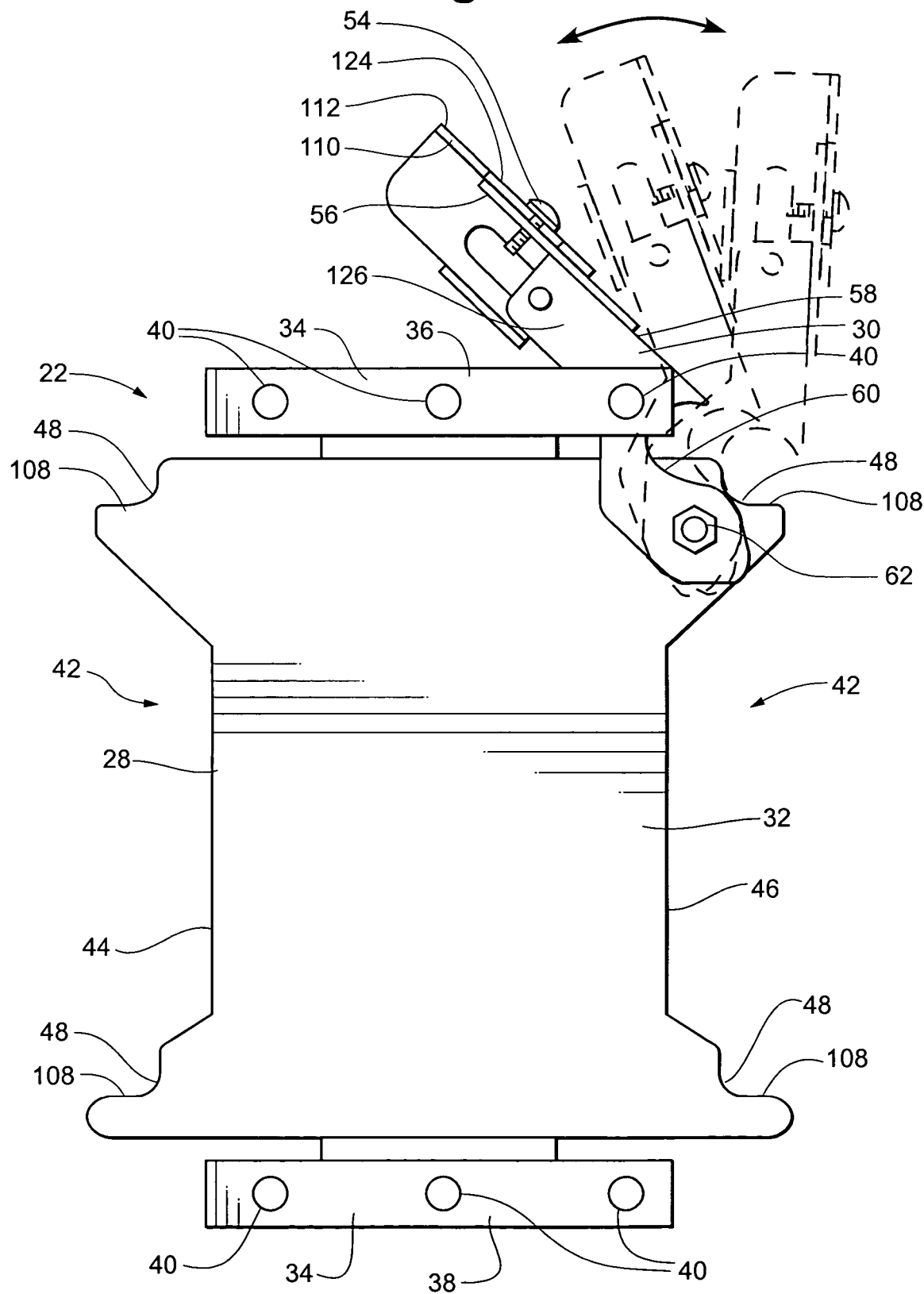
FIG. 5 is a front elevation view of the mount bracket of the embodiment of FIG. 2.

Mount bracket 22 generally includes plate 28 and latch arm 30. Plate 28 has a substantially planar center portion 32 with a pair of flanges 34 projecting outwardly and upwardly at upper end 36 and lower end 38. Each flange 34 has one or more apertures 40 for receiving fasteners (not depicted) to fasten mount bracket 22 to a wall surface or other fixed structure. Center portion 32 is generally square as depicted in FIG. 5, with cutouts 42 on opposing sides 44, 46. Notches 48 are defined in periphery 50 of center portion 32 and are open on at least one side to receive fastening buttons 52 of device interface bracket 24 as described in more detail below.

Latch arm 30 generally includes flat elongate body portion 54 having a perpendicularly oriented flange 56 along longitudinal margin 58 above c-shaped cutout 60. Latch arm 30 is pivotally coupled with plate 28 at pivot 62 and is selectively pivotally movable as depicted in FIG. 5. Latch arm 30 may be positioned in an unlatched position, depicted in FIG. 5 with solid lines, and a latched position wherein c-shaped cutout 60 is aligned with notch 48 to define a generally circular aperture. When in the latched position, latch arm 30 engages a fastening button 52 in notch 48 as depicted in FIGS. 2 and 9A and as further described below.

Although latch arm 30 is depicted as a pivotally attached, it will be appreciated that other configurations are possible for a latch to retain device interface bracket 24 on mount bracket 22, and that such alternative configurations are contemplated within the scope of the present invention. Such alternative configurations may include slide latch mechanisms, clips, clamps, or any other device or mechanism suitable for the purpose.

Figure 6:
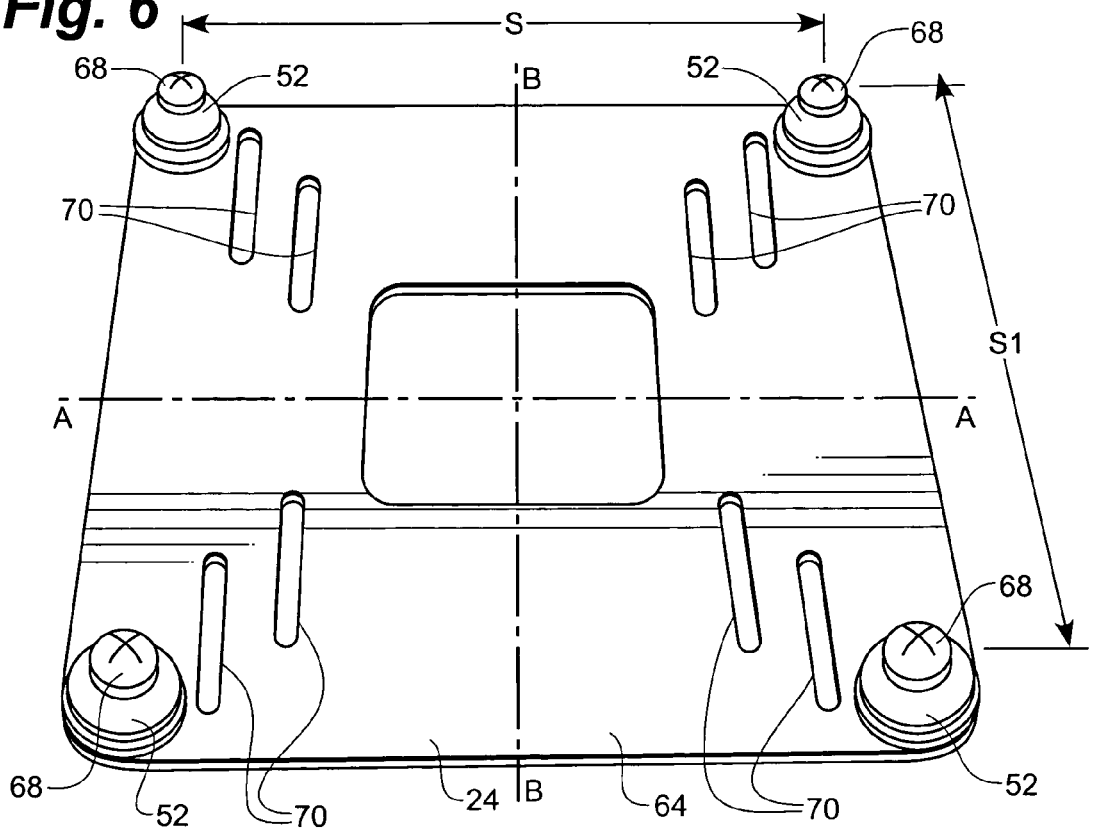
FIG. 6 is a perspective view of the device interface bracket of the mounting device of FIGS. 2 and 2A.

Device interface bracket 24, such as depicted in FIG. 6, generally includes plate 64 and fastening buttons 52 secured with threaded fasteners 68. Apertures 70 are defined in plate 64 to receive fasteners (not depicted) to fasten plate 64 to a flat panel display 26. Apertures 70 are sized and located to correspond with fastener locations on the flat panel display. The elongated shape of apertures 70 enables selective positional adjustment of flat panel display 26 relative to device interface bracket 24. Preferably, apertures 70 are located to correspond with industry standard fastener locations, such as may be specified by the Video Electronics Standards Association (VESA) Flat Panel Monitor Physical Mounting Interface (FPMPMI) standard for example.

As depicted in FIGS. 7A–7H, fastening buttons 52 have a generally columnar structure with a base portion 72, a throat portion 74 and a head portion 76. Upper surface 78 of base portion 72 and lower surface 80 of head portion 76 define a slot 82 therebetween at throat portion 74. Slot 82 has a width dimension, annotated $W_2$ in the drawings, selected so as to be slightly greater than the thickness of periphery 50 of plate 28 at notches 48. In addition, throat portion 74 has a cross-sectional dimension, annotated $W_3$ in the drawings, slightly smaller than the width of notch 48, so that throat portion 74 is receivable therein. When throat portion 74 of fastening button 52 is thus received in notch 48, upper surface 78 of base portion 72 confronts front surface 83 and lower surface 80 confronts back surface 85, with the periphery 50 of plate 28 captured between upper surface 78 and lower surface 80.

Head portion 76 is disposed at distal end 84 of fastening button 52. Head portion 76 has a generally flat, disc like shape. A beveled portion 86 may be provided at the top edge 88 of perimeter 90 of head portion 76. As an alternative, top edge 88 may also be generally rounded off or left square with no rounding or beveling as depicted in FIGS. 7G and 7H respectively.

Figure 7A:
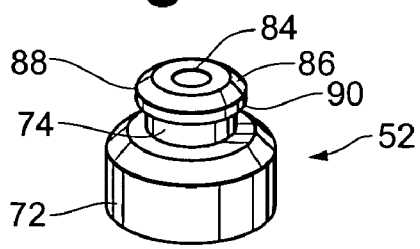
FIG. 7A is a perspective view of a fastening button.
Figure 7B:
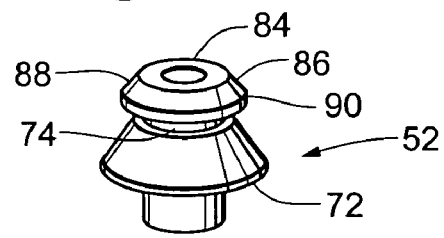
FIG. 7B is a perspective view of an alternative embodiment of a fastening button.
Figure 7C:
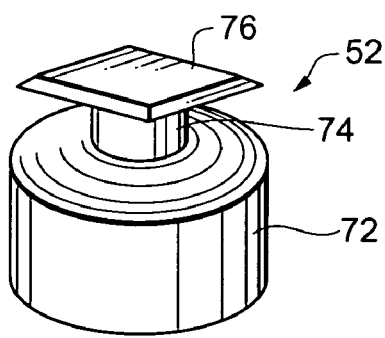
FIG. 7C is a perspective view of another alternative embodiment of a fastening button.
Figure 7D:
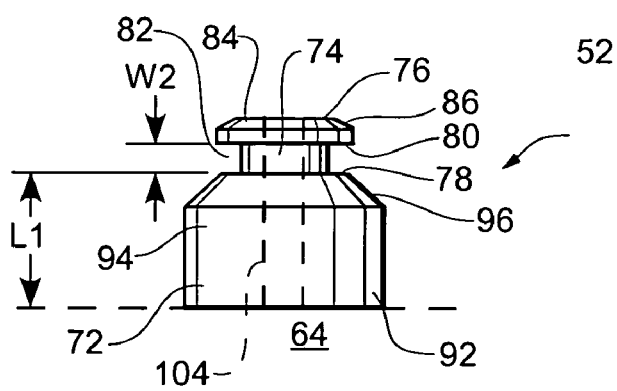
FIG. 7D is a side elevation of the fastening button of FIG. 7A.
Figure 7E:
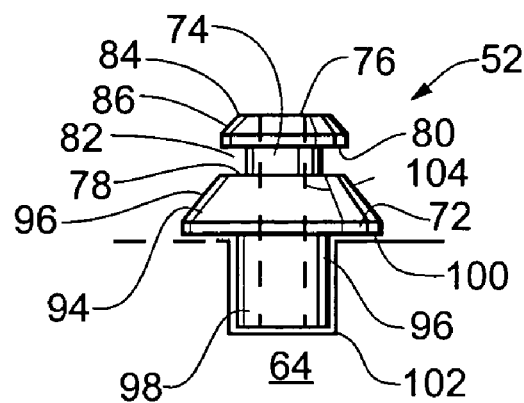
FIG. 7E is a side elevation of the fastening button of FIG. 7B.
Figure 7F:
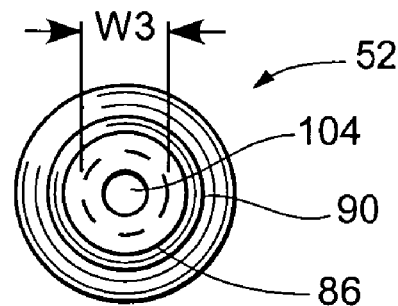
FIG. 7F is a top plan view of the button of FIG. 7A.
Figure 7G:
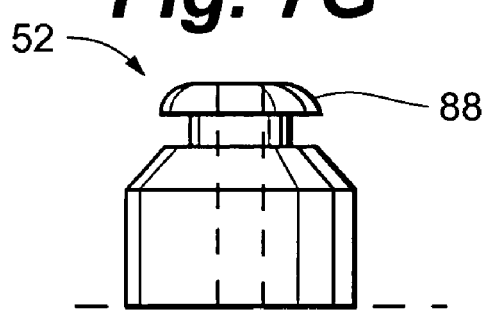
FIG. 7G is a side elevation of another alternative embodiment of a fastening button.
Figure 7H:
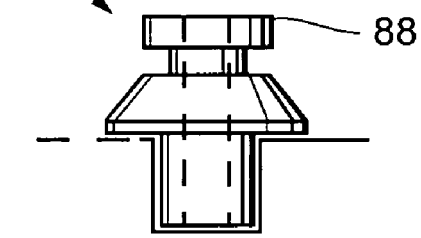
FIG. 7H is a side elevation of an alternative embodiment of a fastening button.

Also, as an alternative to the round head shape depicted in FIGS. 7A and 7B, it is contemplated that other head shapes for fastening button 52 may be used within the scope of the invention. In one example, a square shape such as depicted in FIG. 7C may be used. Other examples may include other polygonal shapes such as a triangle, rectangle, pentagon, hexagon, and the like. Further, other projections such as hooks may be substituted for fastening buttons 52 within the scope of the present invention.

Base portion 72 is disposed at proximal end 92 and has a shank portion 94. Shank portion 94 preferably has a beveled region 96. Shank portion 94 may also have a projecting portion 98 on bottom surface 100 for engaging a suitable recess 102 in a display. The overall length of base portion 72, annotated $L_1$ in the drawings, may be selected to provide any amount of spacing for display interface bracket 24 from display 26 that is needed or desired.

The dimensions and material used for fastening button 52 may be optimized using standard engineering design methods, so as to have appropriate stress resistance and fatigue properties. Further, fastening button 52 may be formed from material that is substantially electrically non-conductive or insulating as disclosed in co-pending U.S. Utility patent application Ser. No. 10/821,395 commonly owned by the owners of the present invention, said application being hereby fully incorporated herein by reference.

Fastening buttons 52 are preferably attached to display interface bracket 24, with proximal end 94 abutting bracket 24, and with distal end 84 extending outwardly therefrom. Fastening button 52 may be attached to bracket 24 by any suitable method such as with fastener 68, which may be a bolt, screw, or rivet, extending through bore 104, as well as with glue or other adhesive, a heat process, or friction fitting projecting portion 98 into recess 102, which may also be a slot or aperture. It is also contemplated that fastening button 52 may be integrally formed with display interface bracket 24 or with flat panel display 26.

Figure 11:
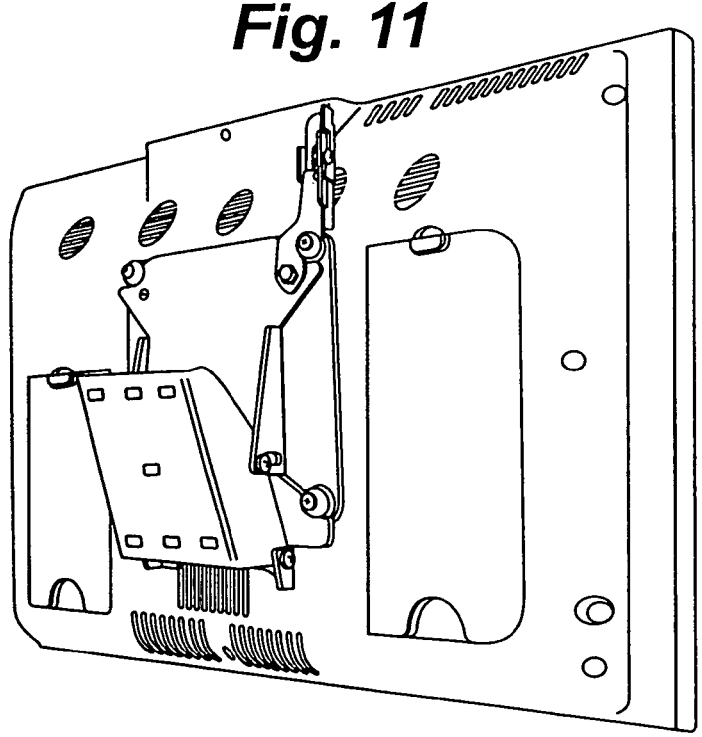
FIG. 11 is a rear perspective view of a flat panel display device with the mount of FIG. 2A attached thereto.

As depicted in the FIG. 6, fastening buttons 52 are positioned in a generally symmetrical pattern about both axes A—A and B—B. Further, button spacings, denoted $S_1$ and S in the drawing are equal so that each fastening button 52 is spaced an equal distance from each adjacent fastening button 52. This symmetrical, equidistant arrangement of fastening buttons 52 enables device interface bracket 24 and the flat panel display 26 to which it is attached to be engaged with mount bracket 24 in any of four orientations positioned 90 degrees apart. Thus, for example, a rectangular flat panel display 26 such as depicted in FIGS. 10 and 11 may be mounted in a so-called "landscape" orientation as depicted, or in one of two "portrait" orientations rotated 90 degrees left or right from the depicted orientation. Further, flat panel display 26 may even be mounted 180 degrees from the depicted orientation in an inverted "landscape" position.

Figure 6A:
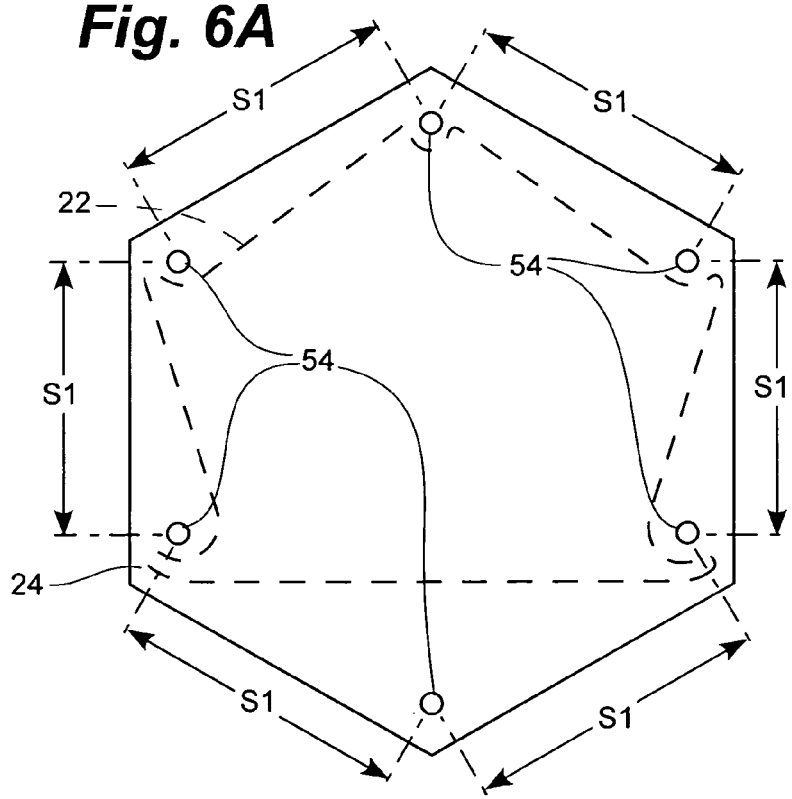
FIG. 6A is a front elevation view of an alterative embodiment of the mounting device of the present invention wherein the fastening buttons are arranged in a regular, symmetrical hexagonal pattern.
Figure 6B:
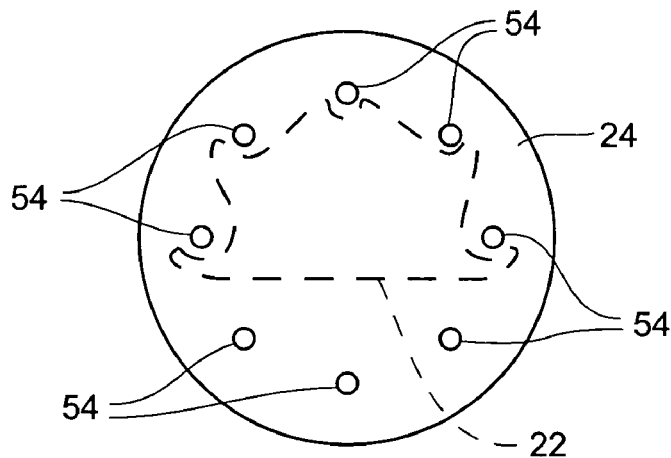
FIG. 6B is a front elevation view of an alterative embodiment of the mounting device of the present invention wherein the fastening buttons are arranged in a regular generally circular pattern.

As will be readily appreciated, fastening buttons 52 may be positioned in any other symmetrical or non-symmetrical pattern if desired. For example, a non-symmetrical pattern, such as a rectangular pattern, may be used if only one mounting orientation is needed. If further mounting orientations for flat panel display 26 are desired, symmetrical polygonal orientations, such as the hexagonal orientation depicted in FIG. 6A or the generally circular orientation of FIG. 6B may be used with an appropriate mount bracket 22 configuration. The hexagonal configuration of FIG. 6A provides six mounting positions for flat panel display 26 spaced 60 degrees apart, and the circular orientation of FIG. 6B with eight fastening buttons 52 enables eight different mounting positions spaced 45 degrees apart.

In operation, flat panel display 26 is mounted to a fixed structure with mounting device 20 by first attaching mount bracket 22 to the fixed structure so that mount bracket 22 is oriented generally vertically with upper end 36 facing upward. Display interface bracket 24 is attached to the back side 106 of the flat panel display 26 with fastening buttons 52 facing outward. Latch arm 30 is pivoted to the unlatched position to enable engagement of the display interface bracket 24 with the mount bracket 22. The display interface bracket 24 with flat panel display 26 attached is then positioned above mount bracket 22 with the fastening buttons 52 generally vertically aligned with the open side of notches 48. Flat panel display is then lowered into position so that at each notch 48, the periphery 50 of plate 28 engages in slot 82 of one of fastening buttons 52. Once in position, throat portion 74 of each fastening button 52 rests on bearing surface 108 of each notch 48. Latch arm 30 may be pivoted to the latched position so that c-shaped cutout 60 is engaged around head portion 76 of fastening button 52 as depicted in FIGS. 2 and 9A. Dismounting of the display may be easily accomplished by reversing these steps.

Figure 8:
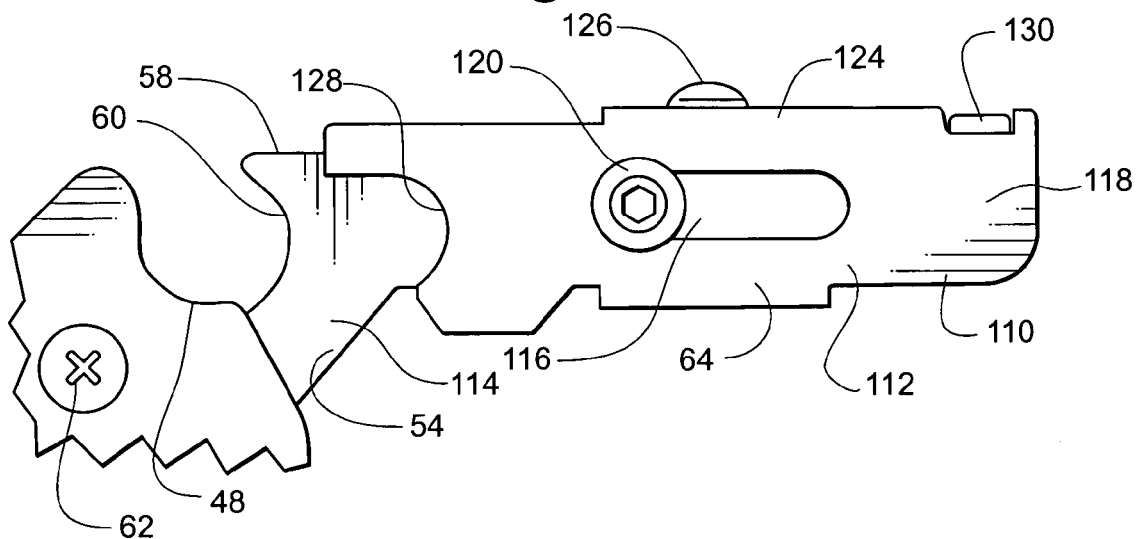
FIG. 8 is an enlarged rear elevation view of an embodiment of the latch arm of the device of the present invention with a slide portion in the unlatched position.
Figure 9:
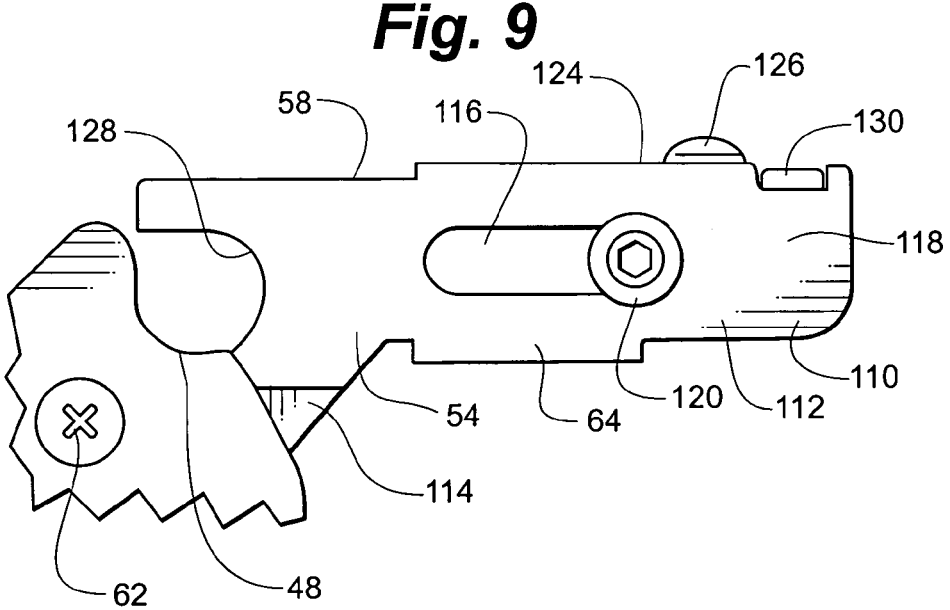
FIG. 9 an enlarged rear elevation view of an embodiment of the latch arm of the device of the present invention with a slide portion in the latched position.
Figure 9A:
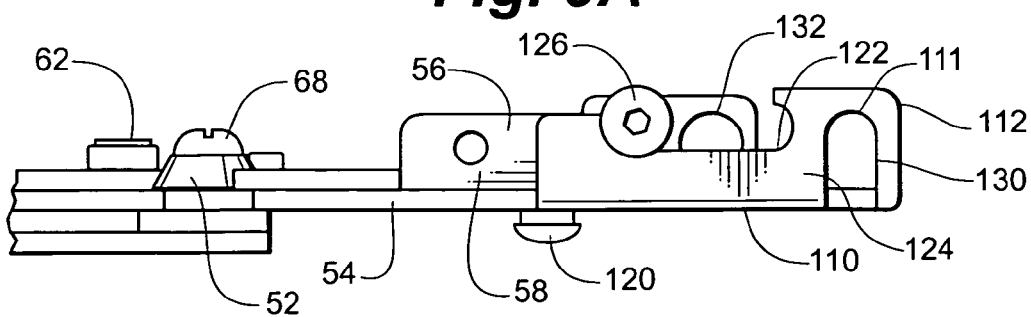
FIG. 9A is an enlarged side elevation view of an embodiment of the latch arm of the device of the present invention.

In some embodiments, latch arm 30 may include a longitudinal slide 110 as depicted best in FIGS. 8, 9, and 9A, for holding latch arm 30 in the latched position. Slide 110 generally includes u-shaped member 112, which is longitudinally slidably disposed on the inwardly facing side 114 of elongate body portion 54 of latch arm 30. Guide slot 116 is defined in bottom surface 118 of u-shaped member 112. Fastener 120 extends through guide slot 116 and secures u-shaped member 112 to body portion 54. Similarly, guide recess 122 is defined in side 124 of u-shaped member 112. Fastener 126, which is threaded into perpendicularly oriented flange 56 of body portion 54 acts as a second guide for longitudinal sliding movement of u-shaped member 112 on body portion 54. Leading edge 128 of u-shaped member 112 is curved to conform generally with the cylindrical shape of throat portion 74 of fastening buttons 52, and has a thickness dimension enabling it to fit into slot 82 of the fastening button. Further, leading edge 128 is generally co-planar with periphery 50 of plate 28 so that when notches 48 are engaged in slots 82 of fastening buttons 52, leading edge 128 is aligned with, and may be slid into slot 82.

As depicted in FIGS. 8 and 9A, slide 110 may be positioned distally in an unlatched position on latch arm 30 so that leading edge 128 is clear of fastening button 52, enabling latch arm 30 to be pivoted. To inhibit pivoting of latch arm 30 and "lock" it in the latched position, u-shaped member 112 is slid longitudinally on body portion 54 of latch arm 30, as depicted in FIG. 9, so that leading edge 128 is engaged in slot 82 of fastening button 52. In this position, leading edge 112 and notch 48 form a substantially closed aperture as depicted in FIG. 9, around throat portion 74 of fastening button 52, thereby preventing latch arm 30 from pivoting until slide 110 is moved once again to the unlatched position. Further, aperture 130 may be provided in side 124 of u-shaped member 112 along with a corresponding aperture 132 in perpendicularly oriented flange 56 of body portion 54. Apertures 130, 132, may be disposed so as to align for the purpose of receiving a padlock (not depicted) when slide 110 is positioned in the latched position.

Figure 4:
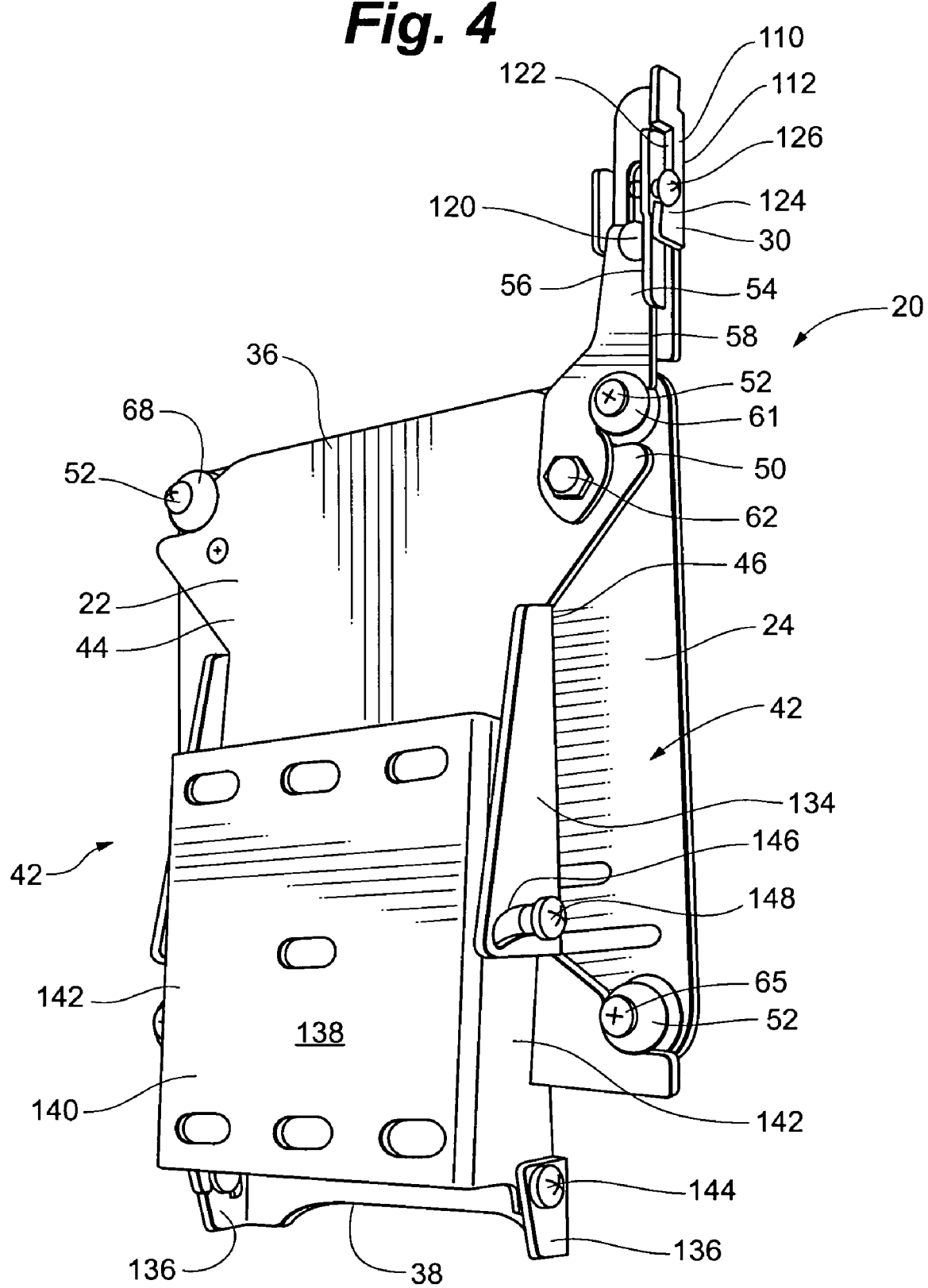
FIG. 4 is a perspective view of the flat panel display mounting system depicted in FIG. 2A with the mount bracket and the device interface bracket engaged and latched together.

A further embodiment of a flat panel display mounting device 20 is depicted in FIGS. 2A, 3–4, 5A, and 11. In this embodiment device interface bracket 24 includes a pair of perpendicular wall portions 134 in cutouts 42 on opposing sides 44, 46. Another pair of perpendicular wall portions 136 is positioned on opposing sides 44, 46 at lower end 38 of plate 28. U-shaped pivot bracket 138 has a generally planar portion 140 with a pair of generally perpendicular sides 142 projecting inwardly toward device interface bracket 24 and confronting perpendicular wall portions 134, 136. Fasteners 144 extend through an aperture (not depicted) in perpendicular wall portions 136 and into u-shaped pivot bracket 138 so that bracket 138 is pivotally movable about fasteners 144 relative to device interface bracket 24. Perpendicular wall portions 134 have a curved guide slot 146. Fasteners 148 extend through guide slot 146 and into u-shaped pivot bracket 138. These fasteners 148 serve to guide and limit the pivoting motion of u-shaped pivot bracket 138. As depicted in FIGS. 4 and 5, a plurality of apertures 150 may be provided in planar portion 140 for receiving fasteners to attach mount bracket 22 to a fixed structure.

Figure 2A:
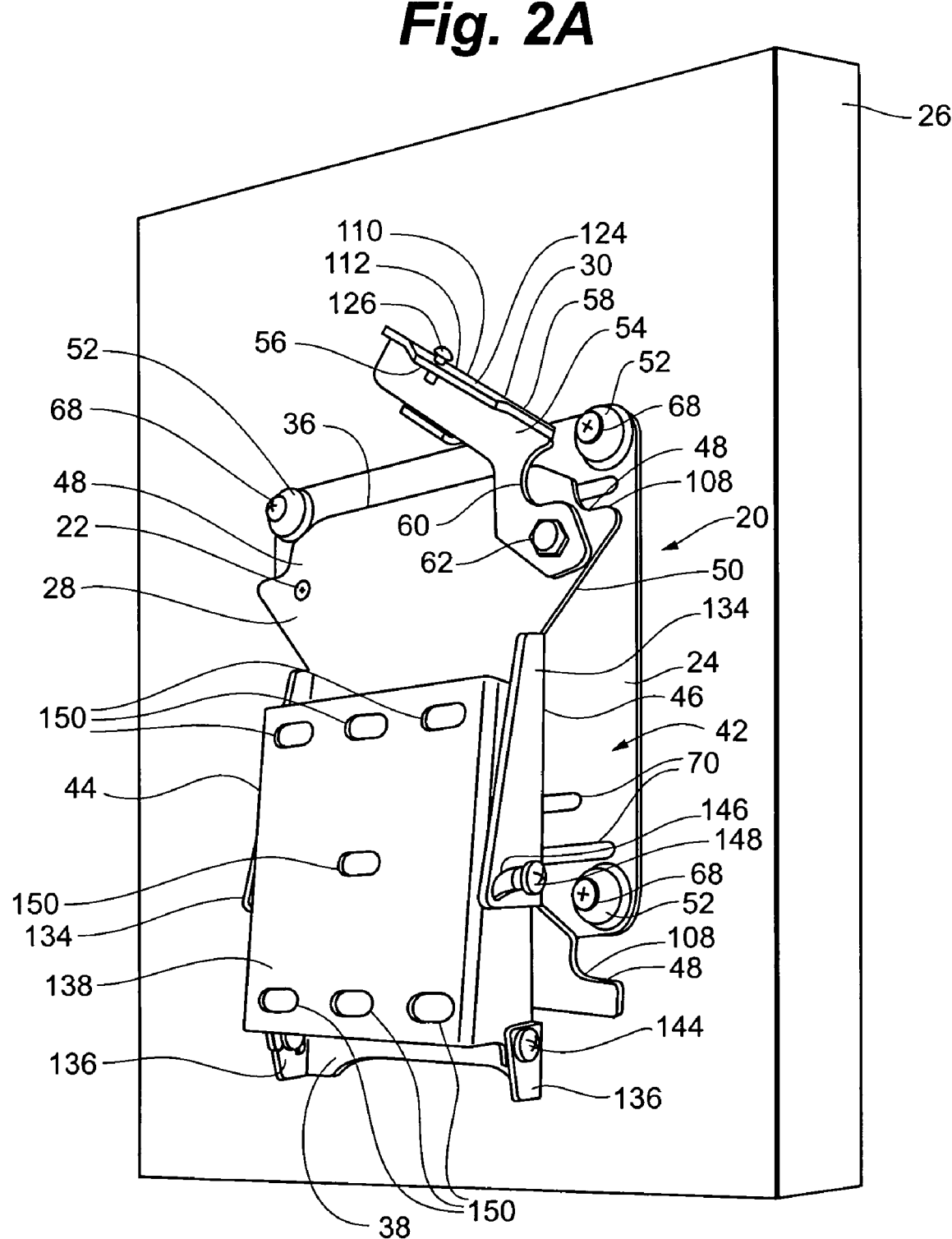
FIG. 2A is a perspective view of an alternative embodiment of a flat panel display mounting system with a flat panel display attached.
Figure 3:
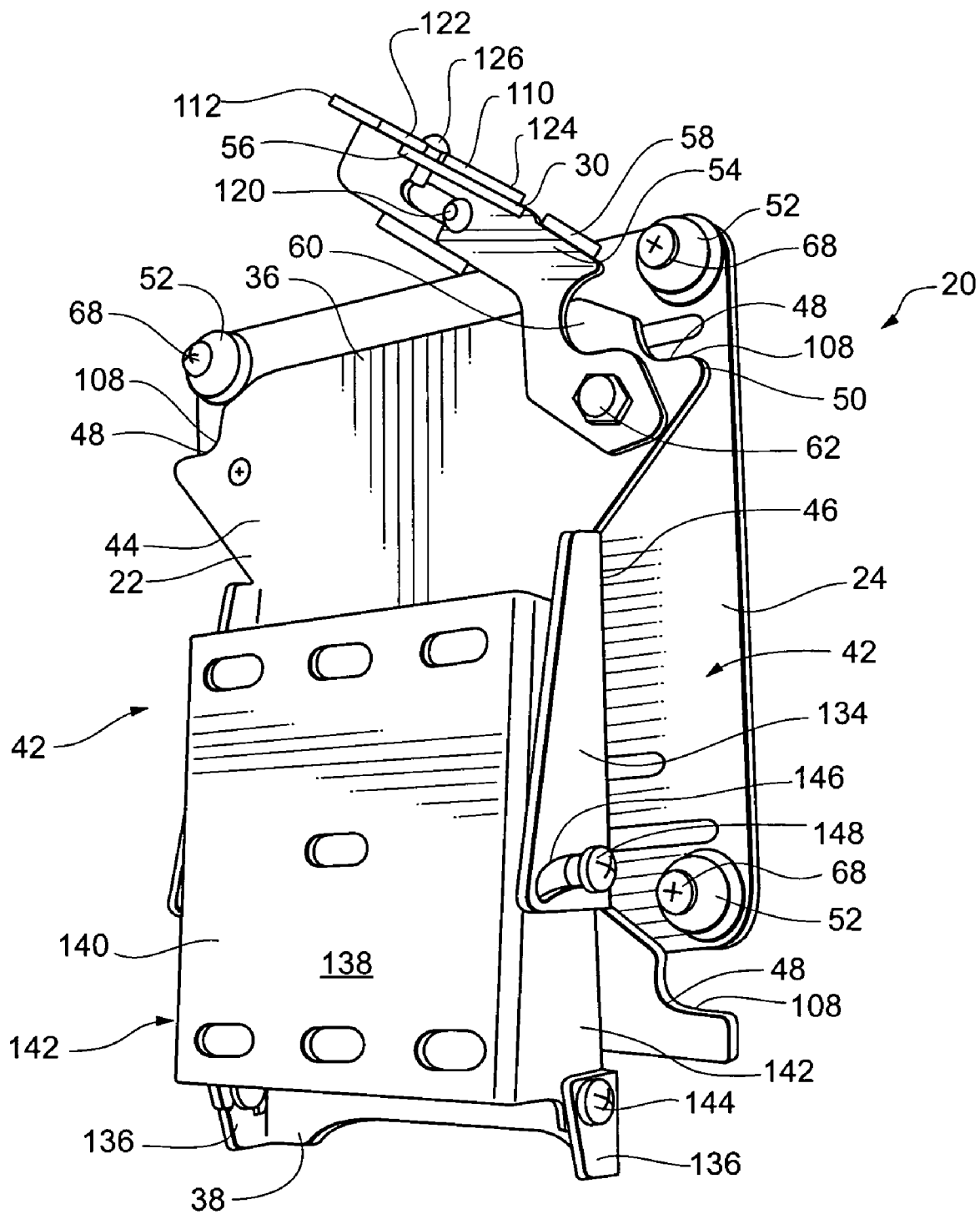
FIG. 3 is a perspective view of the flat panel display mounting system depicted in FIG. 2A with the mount bracket and the device interface bracket positioned for engagement.

In operation, flat panel display 26 is mounted to a fixed structure with mounting device 20 by attaching u-shaped pivot bracket 138 to the fixed structure. Once again, mount bracket 22 is oriented generally vertically with upper end 36 facing upward. Display interface bracket 24 is attached to the back side 106 of the flat panel display 26 with fastening buttons 52 facing outward as depicted in FIG. 2A. Latch arm 30 is pivoted to the unlatched position to enable engagement of the display interface bracket 24 with the mount bracket 22. The display interface bracket 24 with flat panel display 26 attached is then positioned above mount bracket 22 with the fastening buttons 52 generally vertically aligned with the open side of notches 48. Flat panel display is then lowered into position so that at each notch 48, the periphery 50 of plate 28 engages in slot 82 of one of fastening buttons 52. Once in position, throat portion 74 of each fastening button 52 rests on bearing surface 108 of each notch 48. Latch arm 30 may be pivoted to the latched position so that c-shaped cutout 60 is engaged around head portion 76 of fastening button 52 as depicted in FIGS. 4 and 11. In this embodiment, the pitch of flat panel display 26 may be altered by grasping the top edge of the display and pushing or pulling, causing mount bracket 22 to pivot about fasteners 144. Other embodiments may provide a series of detents or holes in place of curved guide slot 146 to provide security from undesired pivoting. Once again, the flat panel display 26 is easily dismounted by reversing these steps.

The mounting device 20 of the present invention enables the flat panel display 26 to be quickly and easily moved from one location to another while maintaining theft deterrence through use of the latch arm 30 and a padlock or other locking device. Mount brackets 22 may be secured to the fixed structure at any locations where the flat panel display may be positioned. Merely by moving latch arm 30 to the unlatched position and lifting upward so as to lift fastening buttons 52 off the bearing surfaces 108 of notches 48, the display can be dismounted and moved to another location. Once in the new location, the fastening buttons 52 may be merely positioned over the notches 48 of the mount plate 22 in the new location and lowered to engage them.

The secure engagement of notches 48 in the slots 82 of the fastening buttons 52 with latch arm 30 ensuring engagement of device interface bracket 24 with mount bracket 22, along with the structural integrity of each component of the device 20, prevents disengagement of the display during seismic activity and accidental physical contact, thereby minimizing injury to persons and damage to the flat panel display 26. With 13 gauge steel mount bracket 22, device interface bracket 24, and fastening buttons 52 of the appropriate strength, the device 10 may comply with appropriate safety standards such as the GR-63 CORE standard for seismic Zone 4 earthquake areas.

Further alternative embodiments of the present invention are contemplated. For example, in one alternative embodiment of the invention, fastening buttons 52 may be attached directly to the back side 106 of the flat panel display 26 thereby eliminating the need for device interface bracket 24. In this alternative embodiment, the fastening buttons 52 affixed directly to flat panel display 26 are engaged and disengaged with mount bracket 22 in the same manner as described hereinabove.

In another alternative embodiment of the invention, mount bracket 22 may be attached to the flat panel display device 26 and device interface bracket 24 may be attached to the fixed structure. It will be appreciated that in this embodiment, mount bracket 22 should be inverted so that the previously described upper end 36 of mount bracket 22 faces downwardly and bearing surfaces 108 bear on the upwardly facing side of fastening buttons 52.

It should be understood that the described and disclosed embodiments are merely exemplary of the invention and that all modifications are intended to be included that do not depart from the spirit of the invention and the scope of the appended claims.

What is claimed is:

1. A system for mounting a flat panel electronic display on a fixed structure, the system comprising:
   a mount bracket adapted to be attachable to the fixed structure, the mount bracket having a periphery defining a plurality of spaced apart open notches;
   a device interface bracket selectively removably receivable on the mount bracket and adapted to be attachable to the flat panel electronic display, the device interface bracket having a plurality of fastening buttons, each fastening button having a base portion, a head portion, and a throat portion therebetween defining a slot, the fastening buttons spaced apart and positioned correspondingly with the notches of the mount bracket so that the slot of each fastening button receives the periphery of the mount bracket at a separate one of the notches when the device interface bracket is received on the mount bracket, wherein the fastening buttons are arranged on the device interface bracket in a polygonal or circular pattern so that the device interface bracket is capable of being received on the mount bracket in at least two orientations, the two orientations being at substantially 90 degrees relative to each other so that the flat panel display can be selectively interchangeably oriented in at least a landscape and a portrait orientation; and an elongate latch arm operably coupled with the mount bracket proximate a first notch of the plurality of notches, the latch arm being selectively shiftable between a latched position wherein a portion of the latch arm is aligned with the first notch to engage and retain in position the fastening button of the device interface bracket received in the first notch when the device interface bracket is received on the mount bracket, and an unlatched position wherein the latch arm is positioned away from the first notch to enable the device interface bracket to be freely engaged and disengaged from the mount bracket.

2. The system of claim 1, wherein the latch arm is pivotably coupled to the mount bracket.

3. The system of claim 2, wherein the latch arm includes a slide portion, the slide portion selectively shiftable between a first position wherein the slide portion is engaged with the fastening button of the device interface bracket so as to inhibit the latch arm from pivoting away from the latched position, and a second position wherein the slide portion is disengaged from the fastening button to enable pivoting of the latch arm.

4. The system of claim 3, wherein the slide portion of the latch arm includes means for locking the slide portion in the first position.

5. The system of claim 1, wherein each fastening button is spaced apart a substantially equal distance from each adjacent fastening button.

6. The system of claim 1, wherein the fastening buttons are arranged in a square pattern.

7. The system of claim 1, wherein the device interface bracket has a plurality of apertures defined therein for receiving fasteners to attach the device interface bracket to the flat panel display.

8. The system of claim 1, wherein the notches in the mounting bracket are conformingly shaped to the throat portion of the fastening buttons.

9. The system of claim 1, wherein the fixed structure is selected from the group consisting of a wall, a ceiling, a column, a beam, and a pole.

10. A mounting system for detachably coupling a pair of bodies, a first one of said pair of bodies including a flat panel display device, a second one of said pair of bodies including a fixed structure, the system comprising:
a first bracket adapted to be operably coupled to one of said pair of bodies, the bracket having a periphery defining a plurality of spaced apart open notches;
a second bracket selectively removably receivable on the first bracket and adapted to be operably coupled to the other of said pair of bodies, the second bracket including a plurality of fastening buttons, each fastening button having a base portion, a head portion, and a throat portion therebetween defining a slot, the fastening buttons spaced apart and positioned correspondingly with the notches of the first bracket so that the slot of each fastening button receives the periphery of the first bracket at a separate one of the notches when the second bracket is received on the first bracket, wherein the fastening buttons are arranged on the second bracket in a polygonal or circular pattern so that the second bracket is capable of being received on the first bracket in at least two orientations, the two orientations being at substantially 90degrees relative to each other so that the flat panel display device can be selectively interchangeably oriented in at least a landscape and a portrait orientation relative to the fixed structure; and
operable means for selectively retaining the second bracket in engagement with the first bracket.

11. The system of claim 10, wherein the first bracket is operably coupled to the fixed structure, and the second bracket is operably coupled to the flat panel display device.

12. The system of claim 11, wherein the means for selectively retaining the second bracket in engagement with the first bracket is a latch arm operably coupled with the first bracket.

13. The system of claim 12, wherein the latch arm is selectively shiftable between a latched position wherein the latch arm is engaged with one of the fastening buttons of the second bracket to retain the first and second brackets in engagement with each other, and an unlatched position wherein the latch arm is not engaged with any of the fastening buttons of the second bracket so as to enable the first and second brackets to be freely engaged and disengaged from each other.

14. The system of claim 13, wherein the latch arm includes a slide portion, the slide portion selectively shiftable between a first position wherein the slide portion is engaged with the fastening button of the second bracket so as to retain the latch arm in engagement with the fastening button, and a second position wherein the slide portion is disengaged from the fastening button to enable the latch arm to be freely engaged and disengaged from the fastening button.

15. The system of claim 14, wherein the slide portion of the latch arm includes means for locking the slide portion in the first position.

16. The system of claim 10, wherein each fastening button is spaced apart a substantially equal distance from each adjacent fastening button.

17. The system of claim 10, wherein the fastening buttons are arranged in a square pattern.

18. The system of claim 10, wherein the device interface bracket has a plurality of apertures defined therein for receiving fasteners to attach the device interface bracket to the flat panel display.

19. The system of claim 10, wherein the notches in the first bracket are conformingly shaped with the throat portion of the fastening buttons.

20. An electronic display and mounting system attachable to a fixed structure comprising:
a flat panel electronic display device;
a first bracket having a periphery defining a plurality of spaced apart open notches;
a second bracket selectively removably receivable on the first bracket, the second bracket including a plurality of fastening buttons, each fastening button having a base portion, a head portion, and a throat portion therebetween defining a slot, the fastening buttons spaced apart and positioned correspondingly with the notches of the first bracket so that the slot of each fastening button receives the periphery of the first bracket at a separate one of the notches when the second bracket is received on the first bracket, one of the first and second brackets selectively operably couplable with the flat panel electronic display device and the other of the first and second brackets operably couplable with the fixed structure, wherein the fastening buttons are arranged on the second bracket in a polygonal or circular pattern so that the second bracket is capable of being received on the first bracket in at least two orientations, the two orientations being at substantially 90 degrees relative to each other so that the flat panel display device can be selectively interchangeably oriented in at least a landscape and a portrait orientation relative to the fixed structure;

means for retaining the first and second brackets in engagement with each other to couple the flat panel electronic display device to the fixed structure.

21. The system of claim 20, wherein the first bracket is operably coupled to the fixed structure, and the second bracket is operably coupled to the flat panel display device.

22. The system of claim 20, wherein the means for selectively retaining the second bracket in engagement with the first bracket is a latch arm operably coupled with the first bracket.

23. The system of claim 22, wherein the latch arm is selectively shiftable between a latched position wherein the latch arm is engaged with one of the fastening buttons of the second bracket to retain the first and second brackets in engagement with each other, and an unlatched position wherein the latch arm is not engaged with any of the fastening buttons of the second bracket so as to enable the first and second brackets to be freely engaged and disengaged from each other.

24. The system of claim 23, wherein the latch arm includes a slide portion, the slide portion selectively shiftable between a first position wherein the slide portion is engaged with the fastening button of the second bracket so as to retain the latch arm in engagement with the fastening button, and a second position wherein the slide portion is disengaged from the fastening button to enable the latch arm to be freely engaged and disengaged from the fastening button.

25. The system of claim 24, wherein the slide portion of the latch arm includes means for locking the slide portion in the first position.

26. The system of claim 20, wherein each fastening button is spaced apart a substantially equal distance from each adjacent fastening button.

27. The system of claim 26, wherein the fastening buttons are arranged in a square pattern.

28. The system of claim 20, wherein the second bracket has a plurality of apertures defined therein for receiving fasteners to attach the second bracket to the flat panel display.

29. The system of claim 20, wherein the notches in the first bracket are conformingly shaped with the throat portion of the fastening buttons.

30. A mounting system for detachably coupling a pair of bodies, a first one of said pair of bodies including a flat panel display device, a second one of said pair of bodies including a fixed structure, the system comprising:

a first bracket adapted to be operably coupled to one of said pair of bodies, the bracket having a periphery defining a plurality of spaced apart open notches;

a plurality of fastening buttons on the other of said pair of bodies, each fastening button defining a slot, the fastening buttons positioned so that the slot of each fastening button is capable of receiving the periphery of the first bracket at a separate one of the notches when the fastening buttons are engaged with the first bracket, wherein the fastening buttons are arranged in a polygonal or circular pattern so that the other of said pair of bodies is capable of being received on the first bracket in at least two orientations, the two orientations being at substantially 90 degrees relative to each other so that the other of said pair of bodies can be selectively interchangeably oriented in at least a landscape and a portrait orientation relative to the first bracket.

* * * * *